(12) United States Patent
Lee

(10) Patent No.: US 9,252,591 B2
(45) Date of Patent: Feb. 2, 2016

(54) VEHICLE POWER CONTROLLING APPARATUS

(71) Applicant: HYUNDAI MOBIS CO., LTD., Seoul (KR)

(72) Inventor: Jin Woo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 8 days.

(21) Appl. No.: 14/445,403

(22) Filed: Jul. 29, 2014

(65) Prior Publication Data

US 2015/0098157 A1 Apr. 9, 2015

(30) Foreign Application Priority Data

Oct. 8, 2013 (KR) ........................ 10-2013-0119546

(51) Int. Cl.
*F21V 7/04* (2006.01)
*H02H 5/04* (2006.01)
*H02H 7/08* (2006.01)
*B62D 5/04* (2006.01)

(52) U.S. Cl.
CPC ........... *H02H 7/0844* (2013.01); *B62D 5/0481* (2013.01); *B62D 5/0487* (2013.01)

(58) Field of Classification Search
CPC ............................ B62D 5/0487; H02H 7/0844
USPC .......................................................... 361/31
See application file for complete search history.

(56) References Cited

U.S. PATENT DOCUMENTS

| 5,039,926 A | * | 8/1991 | Morishita et al. | ............. | 318/434 |
| 8,525,451 B2 | * | 9/2013 | Kitamoto | ...................... | 318/255 |
| 2013/0106320 A1 | * | 5/2013 | Yugo | ............................ | 318/139 |

\* cited by examiner

*Primary Examiner* — Erick Glass
(74) *Attorney, Agent, or Firm* — NSIP Law

(57) ABSTRACT

The present invention relates to a vehicle power controlling apparatus, and more particularly, to a vehicle power controlling apparatus for interrupting a dark current from an ECU power front stage of a motor driven power steering (MDPS) system.

The vehicle power controlling apparatus includes: a power control signal receiving block configured to receive a power control signal (for example, a vehicle ignition signal IGN_ENA); a dark current preventing block configured to prevent a power voltage Vbat from flowing before the power control signal from a next stage of the power control signal receiving block; a relay block that is relayed on or off when the power voltage is turned on or off to supply a current to the motor from the power voltage; a relay shortening block configured to shorten the relay-on time by rapidly increasing the voltage before the relay is turned on of the relay block, between the dark current preventing block and the relay block; and a relay recognizing block configured to recognize the relay on or the relay off by reducing the voltage after a relay on signal or relay off signal which is applied to the relay block.

4 Claims, 4 Drawing Sheets

VEHICLE POWER CONTROLLING APPARATUS

CROSS-REFERENCE TO RELATED APPLICATION

This application claims priority to and the benefit of Korean Patent Application No. 10-2013-0119546 filed in the Korean Intellectual Property Office on Oct. 8, 2013, the entire contents of which are incorporated herein by reference.

TECHNICAL FIELD

The present invention relates to a vehicle power controlling apparatus, and more particularly, to a vehicle power controlling apparatus for interrupting a dark current from an ECU power front stage of a motor driven power steering (MDPS) system.

BACKGROUND OF THE INVENTION

Generally, in an electronic control unit (ECU) front stage of a motor driven power steering (MDPS) system, a dark current (leakage current) is generated until vehicle ignition is turned on to discharge a vehicle battery.

FIG. 1 is a circuit diagram illustrating an ECU power circuit in the related art.

Referring to FIG. 1, when a Vlink voltage becomes 60% of a Vbat voltage through circuit path #10 during power up, the Vlink voltage is relayed on, and when the Vbat−Vlink voltage becomes a predetermined voltage or less after the relay on command, it can be confirmed that the relay on command is accurately applied.

During power down, in order to stably check a relay off after a relay off command, the Vlink voltage is reduced through a discharge circuit 13, and when the Vbat−Vlink voltage has a difference of a predetermined voltage or more, it can be confirmed that the relay off command is accurately applied.

As such, in the related art, even before the vehicle ignition is turned on, that is, even before an IGN_ENA signal is applied, a current path 11 is formed in the EC to generate the dark current (leakage current). Further, in order to prevent a large amount of dark current, since R426 and R427 resistances are largely set, during power down, the discharge circuit needs to be formed.

SUMMARY OF THE INVENTION

The present invention has been made in an effort to prevent a battery from being discharged by preventing a dark current from being generated before vehicle ignition is turned on.

The present invention has also been made in an effort to reduce costs by removing unnecessary components for power controlling.

An exemplary embodiment of the present invention provides a vehicle power controlling apparatus, including: a power control signal receiving block configured to receive a power control signal (for example, a vehicle ignition signal IGN_ENA); a dark current preventing block configured to prevent a power voltage Vbat from flowing before the power control signal from a next stage of the power control signal receiving block; a relay block that is relayed on or off when the power voltage is turned on or off to supply a current to the motor from the power voltage; a relay shortening block configured to shorten the relay-on time by rapidly increasing the voltage before the relay is turned on of the relay block, between the dark current preventing block and the relay block; and a relay recognizing block configured to recognize the relay on or the relay off by reducing the voltage after a relay on signal or relay off signal which is applied to the relay block.

According to the exemplary embodiments of the present invention, it is possible to prevent battery discharging of a vehicle because a dark current does not flow before a power control signal is applied.

A separate discharge circuit is required during power down, but in the present invention, because a resistance is small, the discharge circuit may be removed. This leads to the reduction of a vehicle price.

DETAILED DESCRIPTION OF THE EMBODIMENTS

Various advantages and features of the present invention and methods accomplishing thereof will become apparent from the following description of embodiments with reference to the accompanying drawings. However, the present invention is not limited to exemplary embodiments to be disclosed below, but various forms different from each other may be implemented. The exemplary embodiments are merely intended to make the disclosure of the present invention complete and to completely notify the person with ordinary skill in the art, to which the present invention belongs, of the scope of the invention, and the present invention is only defined by the scope of the claims. Meanwhile, the terms used in the present specification are for explaining the embodiments rather than limiting the present invention. Unless particularly stated otherwise in the present specification, a singular form also includes a plural form. The meaning of "comprises" and/or "comprising" used in this specification does not exclude the existence or addition of aforementioned constituent elements, steps, operations, and/or device, and one or more other constituent elements, steps, operations, and/or devices.

Figure 1:
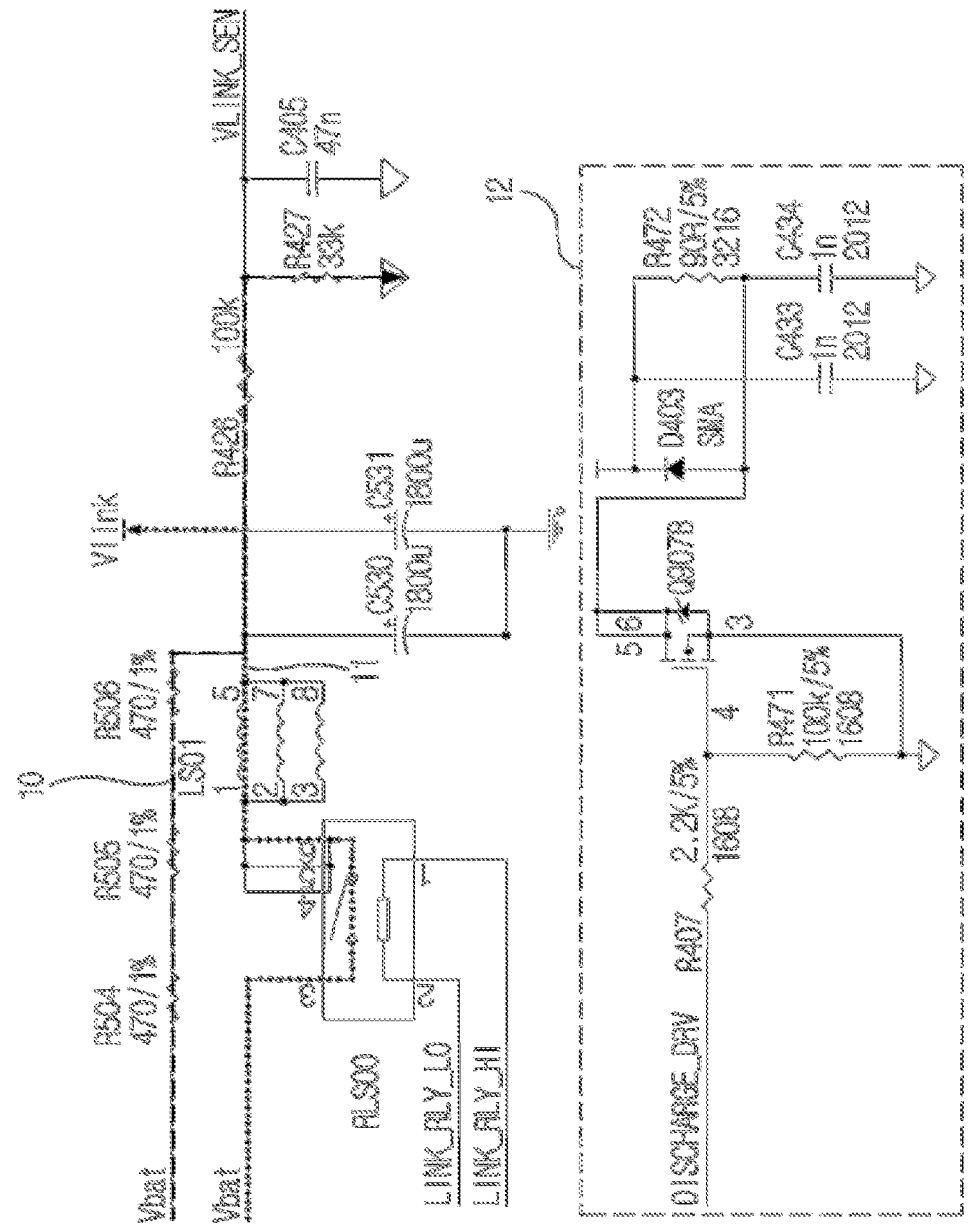
FIG. 1 is a circuit diagram illustrating an ECU power circuit in the related art.
Figure 2:
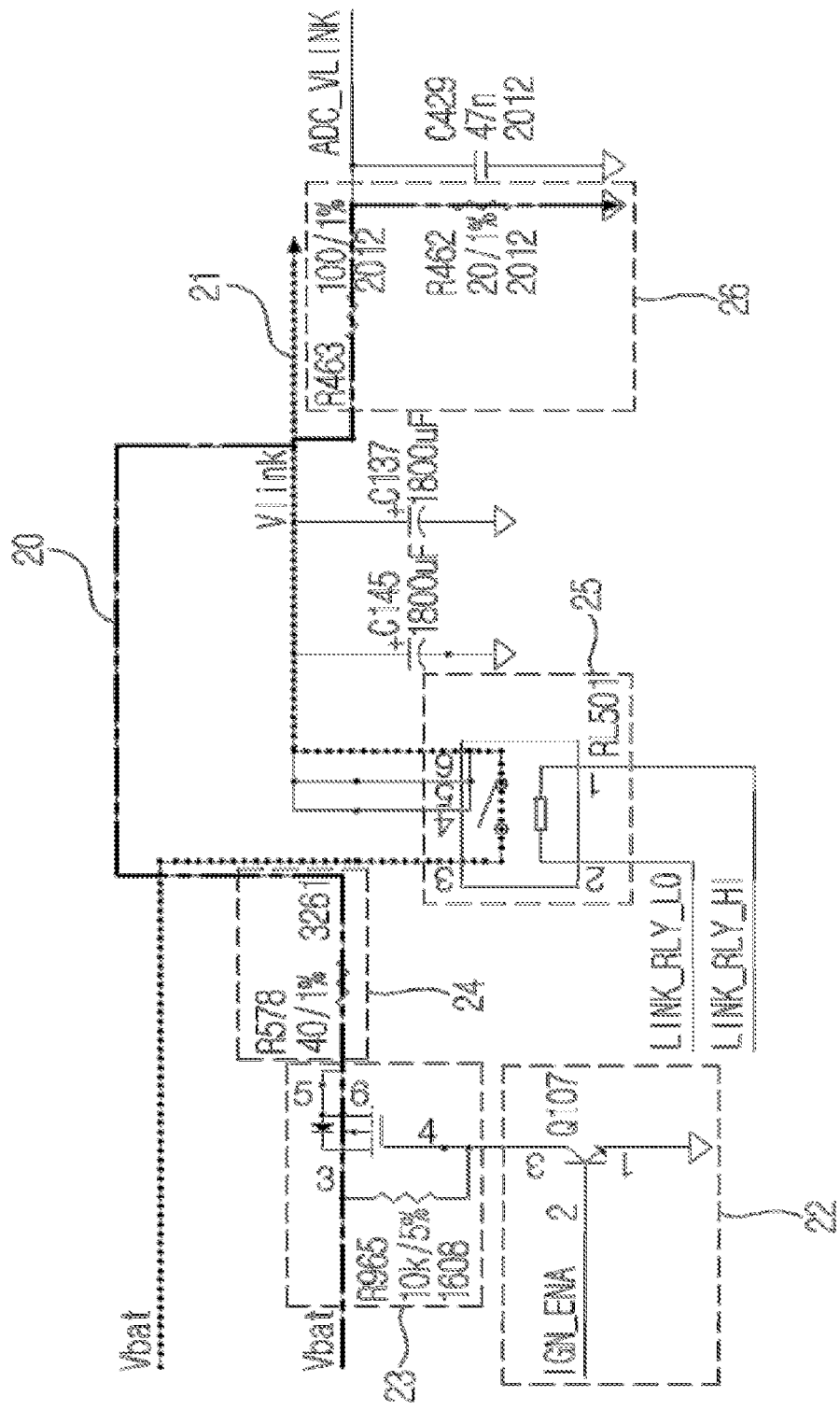
FIG. 2 is a circuit diagram illustrating a power circuit according to an exemplary embodiment of the present invention.

FIG. 2 is a circuit diagram illustrating a power circuit according to an exemplary embodiment of the present invention.

Referring to FIG. 2, a power circuit in an electronic control unit (ECU) of a motor driven power steering (MDPS) system according to an exemplary embodiment of the present invention includes a power control signal receiving block 22 that receives a power control signal (for example, a vehicle ignition signal IGN_ENA), a dark current preventing block 23 that prevents a power voltage Vbat from flowing before the power control signal from a next stage of the power control signal receiving block, a relay block 25 that is relayed on or off when the power voltage is turned on or off to supply a current to a motor from the power voltage, a relay shortening block 24 that shortens the relay-on time by rapidly increasing the voltage before the relay is turned on of the relay block 25, between the dark current preventing block 23 and the relay block 25, and a relay recognizing block 26 that recognizes the relay on or the relay off by reducing the voltage after a relay on signal or relay off signal which is applied to the relay block 25.

The power circuit applies the relay on signal to the relay block 25 when a Vlink voltage becomes ⅔ of the Vbat voltage through circuit path #20. As such, when the relay on signal is applied, circuit path #21 is formed, and a high current is supplied to the motor from the power voltage through the formed circuit path.

Figure 3:
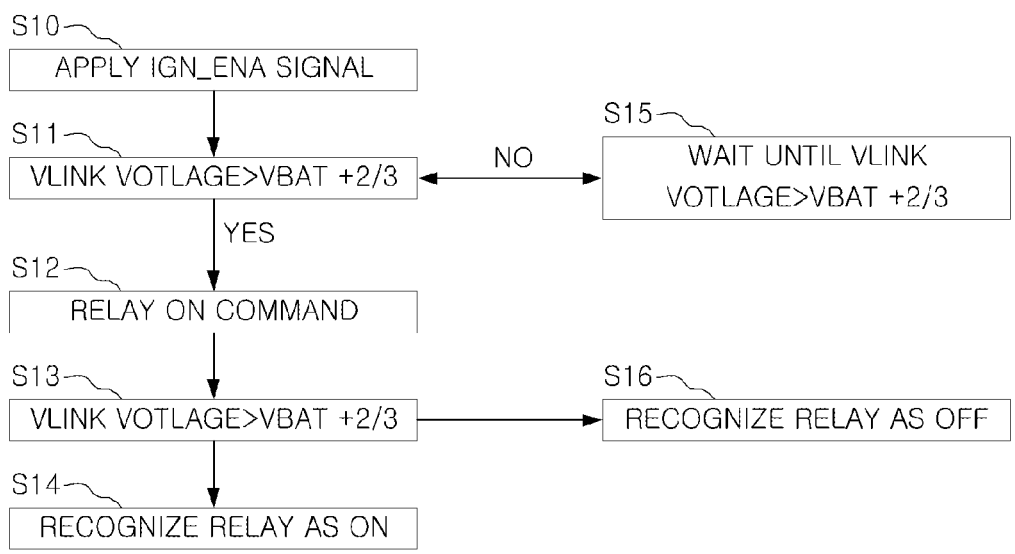
FIG. 3 is a flowchart illustrating a power controlling method for power up according to another exemplary embodiment of the present invention.

FIG. 3 is a flowchart illustrating a power controlling method for power up according to another exemplary embodiment of the present invention.

Referring to FIG. 3, after a power control signal (for example, a vehicle ignition signal IGN_ENA) is applied, when a relay on reference voltage Vlink becomes ⅔ of the power voltage Vbat, a relay on signal is applied to the relay block (S10, S11, and S12).

When a difference between the relay on reference voltage and the power voltage is 0.8 V or less, the relay recognizing block recognizes the relay on (S13 and S14). However, when the difference between the relay on reference voltage and the power voltage is 0.8 V or more, the relay recognizing block recognizes the relay off (S16).

As such, until the power control signal (IGN_ENA signal and vehicle ignition signal) is input before powering up, the power circuit is relayed off, and as a result, the dark current does not flow.

Until the power circuit is relayed on after the IGN_ENA signal is input, a charged velocity of the Vlink is increased, and when the Vlink voltage becomes ⅔ of the Vbat voltage, the power circuit is relayed on.

For fail/safe after the power circuit is relayed on, the relay on or off is recognized as the relay on when Vbat−Vlink<0.8V.

Figure 4:
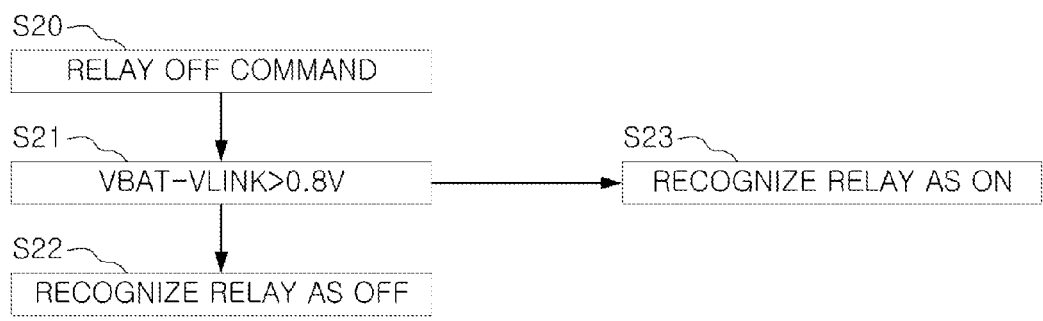
FIG. 4 is a flowchart illustrating a power controlling method for power down according to another exemplary embodiment of the present invention.

FIG. 4 is a flowchart illustrating a power controlling method for powering down according to another exemplary embodiment of the present invention.

Referring to FIG. 4, when the ECU outputs a relay off control command (S20), the ECU recognizes the relay as off when a Vbat−Vlink voltage difference is larger than 0.8 V (S21 and S22).

However, when the Vbat−Vlink voltage difference is smaller than 0.8, the ECU recognizes the relay as on (S21 and S22).

As such, in the present invention, after the relay off command, the Vlink voltage rapidly drops, and as a result, the relay on or off may be rapidly confirmed without using the discharge circuit.

In the present invention, positions of one or more cameras may be determined by performing at least one of measuring a signal intensity of radio image signals, recognizing specific symbol images included in the radio image signals, and recognizing edge patterns of the radio image signals.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

Since various substitutions, changes, transforms, and changes can be made within the scope without departing from the technical spirit of the present invention by those skilled in the art, the present invention is not limited to the aforementioned exemplary embodiments and the accompanying drawings, but all or some of the respective exemplary embodiments may be selectively combined and constituted so that various modifications can be achieved.

What is claimed is:

1. A vehicle power controlling apparatus, comprising:
    a power control signal receiving block configured to receive a power control signal;
    a dark current preventing block configured to prevent a power voltage from flowing before the power control signal from a next stage of the power control signal receiving block;
    a relay block that is relayed on or off when the power voltage is turned on or off to supply a current to the motor from the power voltage;
    a relay shortening block configured to shorten the relay-on time by rapidly increasing the voltage before the relay is turned on of the relay block, between the dark current preventing block and the relay block; and
    a relay recognizing block configured to recognize the relay on or the relay off by reducing the voltage after a relay on signal or relay off signal which is applied to the relay block.

2. The vehicle power controlling apparatus of claim 1, wherein:
    when a relay on reference voltage becomes ⅔ of the power voltage after the power control signal is applied, the relay on signal is applied to the relay block.

3. The vehicle power controlling apparatus of claim 2, wherein:
    when the difference between the relay on reference voltage and the power voltage is 0.8 V or less, the relay recognizing block recognizes the relay on.

4. The vehicle power controlling apparatus of claim 2, wherein:
    when the difference between the relay on reference voltage and the power voltage is 0.8 V or more, the relay recognizing block recognizes the relay off.

* * * * *